United States Patent
Steel

(10) Patent No.: US 8,946,923 B2
(45) Date of Patent: Feb. 3, 2015

(54) WIND-TRACKING TWIN-TURBINE SYSTEM

(76) Inventor: Dennis Patrick Steel, Moers (DE)

( * ) Notice: Subject to any disclaimer, the term of this patent is extended or adjusted under 35 U.S.C. 154(b) by 0 days.

(21) Appl. No.: 13/990,043

(22) PCT Filed: Dec. 3, 2011

(86) PCT No.: PCT/EP2011/006062
§ 371 (c)(1),
(2), (4) Date: Jun. 18, 2013

(87) PCT Pub. No.: WO2012/079711
PCT Pub. Date: Jun. 21, 2012

(65) Prior Publication Data
US 2014/0054895 A1    Feb. 27, 2014

(30) Foreign Application Priority Data

Dec. 13, 2010 (DE) .......................... 10 2010 054 365
Feb. 2, 2011  (DE) .......................... 10 2011 010 177
Aug. 3, 2011  (DE) .......................... 10 2011 109 217

(51) Int. Cl.
| | |
|---|---|
| F03B 13/00 | (2006.01) |
| H02P 9/04 | (2006.01) |
| H02K 7/18 | (2006.01) |
| F03D 3/00 | (2006.01) |
| F03D 3/06 | (2006.01) |

(52) U.S. Cl.
CPC .............. *H02K 7/1823* (2013.01); *F03D 3/005* (2013.01); *F03D 3/065* (2013.01); *F05B 2210/16* (2013.01); *F05B 2240/213* (2013.01); *F05B 2240/217* (2013.01); *F05B 2240/40* (2013.01); *Y02B 10/30* (2013.01); *Y02E 10/74* (2013.01)
USPC ............................................................ 290/54

(58) Field of Classification Search
CPC ........ H02K 7/1823; H02K 7/18; F03D 3/005; F03D 3/065; F05B 2210/16; F05B 2240/217; F05B 2240/213; F05B 2240/40; Y02B 10/30; Y02E 10/74
USPC ........................................ 290/42–44, 53–55
See application file for complete search history.

(56) References Cited

U.S. PATENT DOCUMENTS

| | | | |
|---|---|---|---|
| 4,037,983 A | 7/1977 | Poeta | |
| 4,156,580 A * | 5/1979 | Pohl | 415/4.2 |
| 4,764,683 A | 8/1988 | Coombes | |
| 4,960,363 A * | 10/1990 | Bergstein | 415/3.1 |
| 5,495,128 A * | 2/1996 | Brammeier | 290/55 |
| 5,850,108 A * | 12/1998 | Bernard | 290/54 |
| 6,942,454 B2 * | 9/2005 | Ohlmann | 416/11 |
| 6,984,899 B1 * | 1/2006 | Rice | 290/44 |
| 7,633,177 B2 * | 12/2009 | Platt | 290/54 |
| 8,008,792 B2 * | 8/2011 | Gray | 290/42 |
| 8,154,145 B2 * | 4/2012 | Krauss | 290/54 |

(Continued)

FOREIGN PATENT DOCUMENTS

WO    2011022836 A    3/2011

*Primary Examiner* — Javaid Nasri
(74) *Attorney, Agent, or Firm* — Andrew Wilford

(57) ABSTRACT

A turbine system for wind and/or water power is characterized in that two radial turbines (1, 2) aligned next to each other and in parallel are arranged having a vertical axis of rotation, said radial turbines being connected to each other and being pivotable about a pivot axis (3) parallel to the turbine axes (18), wherein the pivot axis and a V-shaped wind distributor (3) are located outside the connecting line between the turbine axes and both on the same side of the connecting line.

7 Claims, 7 Drawing Sheets

(56) References Cited

U.S. PATENT DOCUMENTS

| | | | |
|---|---|---|---|
| 8,167,533 B2 * | 5/2012 | Lucy et al. | 415/4.2 |
| 8,310,079 B2 * | 11/2012 | Kingston | 290/54 |
| 8,419,367 B2 * | 4/2013 | Fite | 416/119 |
| 8,432,056 B2 * | 4/2013 | Bailey et al. | 290/54 |
| 8,471,399 B2 * | 6/2013 | Lefranc | 290/55 |
| 8,508,063 B2 * | 8/2013 | Rhinefrank et al. | 290/53 |
| 8,657,575 B2 * | 2/2014 | Morris | 416/79 |
| 2008/0085179 A1 | 4/2008 | Edgar | |

* cited by examiner

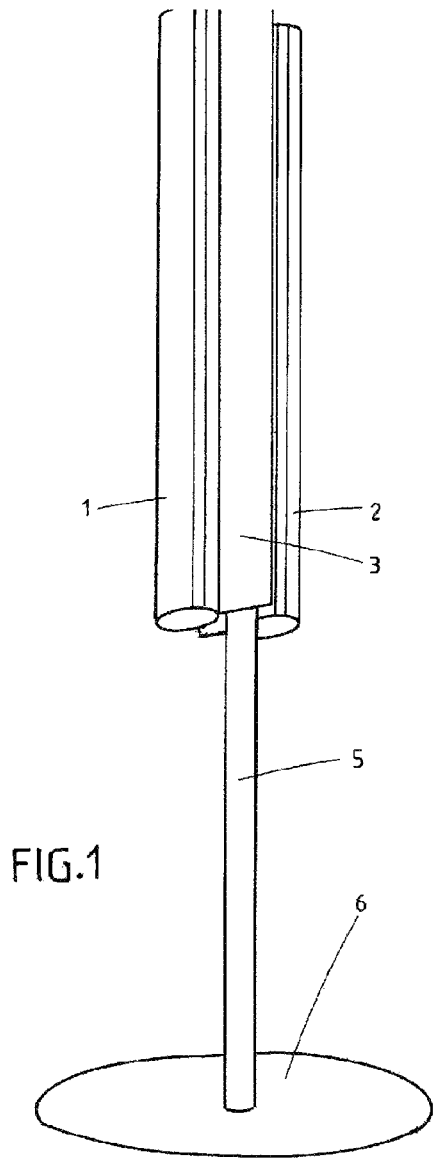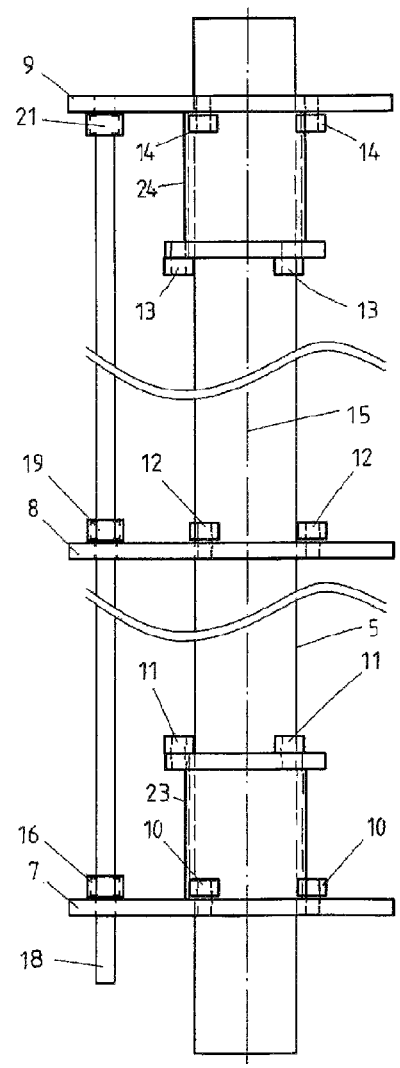

Wind

WIND-TRACKING TWIN-TURBINE SYSTEM

CROSS REFERENCE TO RELATED APPLICATIONS

This application is the US-national stage of PCT application PCT/EP2011/006062 filed 3 Dec. 2011 and claiming the priority of German patent application 102010054365.9 itself filed 13 Dec. 2010, German patent application 102011010177.2 itself filed 2 Feb. 2011, and German patent application 102011109217.3 itself filed 3 Aug. 2011.

FIELD OF THE INVENTION

The invention relates to a turbine system comprising two radial turbines.

PRIOR ART

By comparison with the known three-blade wind-powered generators having a horizontal axis of rotation and aircraft-type blades, a radial turbine has the major advantage of operating independently of the direction of the incident wind. Thus, the radial turbine having a vertical axis of rotation does not have to be turned to the wind.

In a particularly economical embodiment, the radial turbine is provided with deflector plates that collect the wind energy and deflect it onto the blades of the radial turbine in a concentrated form. However, this has the drawback that, because of the deflector plate, independence from the wind direction is no longer achieved. The radial turbine comprising a deflector plate therefore has to be tracked to the wind.

An arrangement according to the international patent application WO 2011/059760 A2 [U.S. Pat. No. 8,167,533] (having the priority of 29.10.2009) is known that in any case is not aerodynamically optimized and does not automatically orientate itself to face into the wind. In this case, economical operation is not possible. This applies in particular to wind-powered generators of the VAWT (vertical axis wind turbine) type that operate more easily in regions of light wind at low heights.

Moreover, it should be noted that the principle of the above-mentioned patent application had already been applied for as a specific configuration more than 2 months earlier (see WO 2011/022836 A8—having the priority of 28.08.2009). This device does not automatically orientate itself to face into the wind at low wind speeds that can easily be demonstrated by reproduction, for example with a turbine diameter of approximately 1 m including power transmission and a connected generator.

OBJECT AND SOLUTION ACCORDING TO THE INVENTION

The object of the invention is a radial turbine that comprises a deflector plate and that automatically turns to an optimum angular position with respect to the incident wind, and is thus self-tracking, without a tracking arrangement being necessary for this purpose. The advantages of the deflector plate in the radial turbine are thus to be combined with the independence of the radial turbine from the incident wind direction.

SUMMARY OF THE INVENTION

This object is achieved in accordance with the invention in that two radial turbines oriented parallel side by side with vertical rotation shafts are interconnected, and are pivotable about a pivot shaft parallel to the turbine shafts. The pivot shaft and a V-shaped wind splitter are positioned outside a line connecting the turbine shafts that are both on the same side of the connecting line.

Another important consideration: suppose there are two turbines in a system enclosed by deflector plates and having additional beveled concentration plates that are attached above and below the turbines. As a result of the closed system and the additional concentration plates, optimum use is made of what is known as the Magnus effect, and as a result the system according to the invention, which is mounted on a mast, can rotate to the wind automatically and thus always receive an optimum wind flow. This "turning to the wind" has been demonstrated in a number of specific models in natural wind.

The Magnus effect, named after Heinrich Gustav Magnus (1802-1870), who discovered it, is a phenomenon in fluid mechanics, specifically the transverse force effect (force) experienced by a round rotating body (cylinder or ball) in a flow.

By way of frictional effects, a rotating roller induces rotation in the fluid surrounding it. If there is additionally a flow over the roller, the different speeds of fluid overlap. As a result, the fluid flows around the rotating roller faster on one side than on the other (in the rest system of the roller). On the side of the roller where the frictional effects are greater, it is as if the fluid were flowing more rapidly. This results in "deflection" of the roller, pushing the roller downward (see FIG. 4).

EXAMPLES

Soccer players kick the ball with spin in such a way that it flies into the goal in an arc. The more quickly it rotates, the greater the deviation of the path (curling cross, knuckleball).

Table tennis players and tennis players use this effect, for example with topspin and slicing.

Curve balls in baseball and risers in softball.

Spin-bowling in cricket.

Golf balls have a large number of small depressions on the surface, known as dimples. As turbulators, they improve the adhesion of the boundary layer that lies against the ball and is entrained by the rotation thereof. This increases the formation of turbulence and the associated deviation of the ball due to the Magnus effect. Since the golf ball rotates backward as a result of the wedge shape of the golf club, it is lifted by the Magnus effect; it does not simply fly like a cannonball, but instead experiences lift. Additional deviations to the left or right are possible, and are also used by players who have mastered this technique. Moreover, the supercritical turbulent circulation reduces the air resistance, and this in turn leads to greater flight distances.

According to the invention, high performance is achieved in combination with low installation costs in such a way that the cost-effectiveness in terms of power output is much greater than in the known wind-powered generators comprising a horizontal shaft and blades of the aircraft-wing type.

To increase the cost-effectiveness, a ring generator is provided for power generation. In addition, to increase the cost-effectiveness further, the mast and the wind splitter can be used as advertising space.

By contrast with the known wind-powered generators comprising a horizontal shaft and three blades, the radial turbine according to the invention can be operated even at relatively low wind speeds. As a result of the Magnus effect, the radial turbine according to the invention "pulls" the wind in, as it were, and amplifies low wind speeds. For example, the radial turbine according to the invention can also be used in circulating winds, in which the wind speed is greater below at a low height than when at the considerable height at which the three-blade wind-powered generators have to be operated simply because of the blade size. A wind speed that is too low for the known three-blade turbines in any case is sufficient for energy production with the radial turbine according to the invention.

In the event of fluctuations in the wind direction, the radial turbine according to the invention adjusts itself automatically, partly as a result of the Magnus effect, and immediately rotates to the optimum direction, even at wind speeds of less than 1 m/s. Rapid adaptations of this type of the generator are not possible with the known three-blade turbines.

Since the radial turbine according to the invention only takes up a small amount of space, it can be used as an add-on to pre-existing parts of buildings or structural elements, for example as an attachment to a street light.

BRIEF DESCRIPTION OF THE DRAWING

In the following, a plurality of embodiments of the invention are described in greater detail with reference to drawings. Like reference numerals have the same significance in all of the drawings and are therefore only explained once. In the drawings:

FIG. 1 is a perspective view of the wind-powered generator according to the invention comprising two radial is turbines, FIG. 2 shows the construction of an embodiment as a tubular mast mounting system in a view from the side in accordance with A-A in FIG. 3, FIG. 13b is a plan view of the section A-A in FIG. 13a.

SPECIFIC DESCRIPTION OF THE INVENTION

FIG. 1 is a perspective drawing of the wind-powered generator according to the invention, comprising two radial turbines 1, 2 and a V-shaped wind splitter 3, the radial turbines and wind splitter being attached to a steel mast 5 or another base part 6 so as to be rotatable (pivotable) as a whole about a vertical axis.

The efficiency of the wind-powered generator is substantially dependent on the position of the V-shaped wind splitter 3, based on the distance and inclination to the turbine blades and the turbine shaft. The wind-powered generator is additionally advantageously technically equipped such that, according to the wind speed, the optimum position of the wind splitter 3 can be set. The setting can take place on the one hand as a fixed setting for the average (most probable) wind speed; on the other hand, it is also possible to automatically reset to the optimum position based on the current wind speed.

For an overall height of 20 m, the height of the turbines is 10 m. The turbines have a diameter of 1 m. The expected capacity for a site on the coast, where the wind-powered generator captures the circulating coastal wind, is approximately 21,700 kWh, with an efficiency averaged over the year of 38%.

Figure 3:
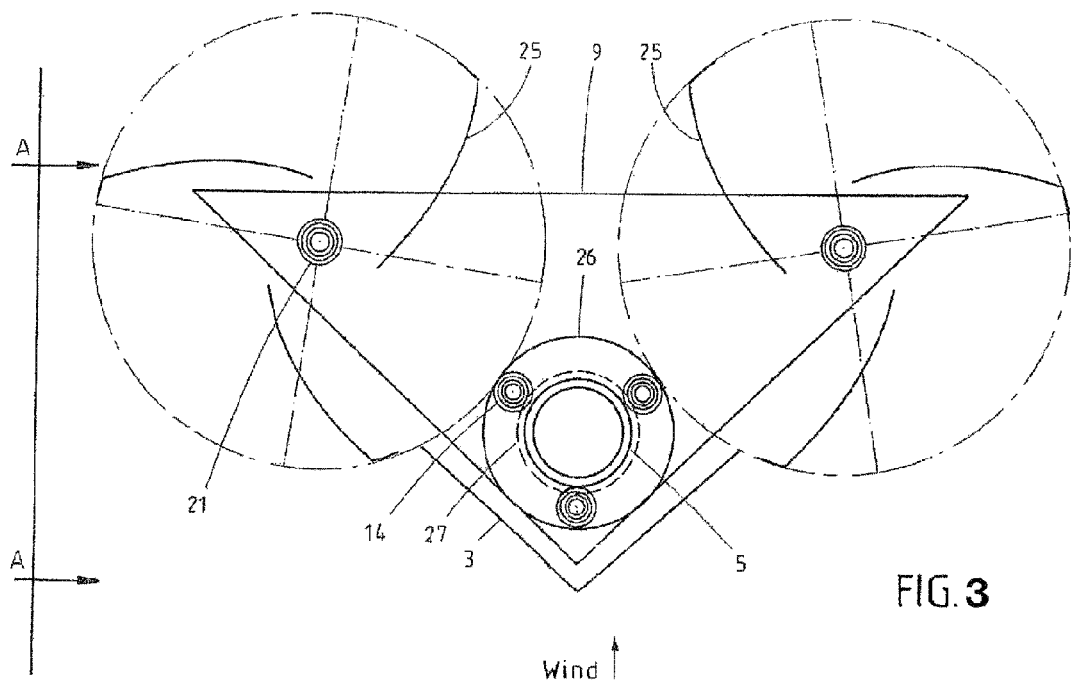
FIG. 3 is a plan view of the wind-powered generator.
Figure 4:
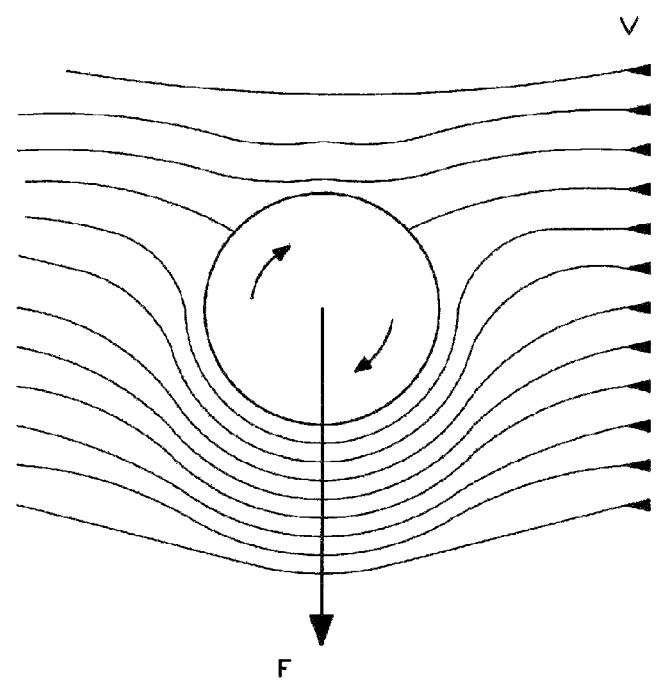
FIG. 4 shows a rotating roller with surrounding fluid.

FIG. 2 shows the construction of an embodiment as a tubular mast mounting system in a view from the side corresponding to A-A in FIG. 3. Three support plates 7, 8, 9 are attached to the 20 m high steel mast 5 by bearings 10, 11, 12, 13, 14 so as to be rotatable about the longitudinal axis 15 of the steel mast 5. The lower support plate 7 has three rotary bearings 10 on the steel mast 5 and two turbine bearings 16, 17 on the turbine shaft 18. The central turbine plate 8 has three rotary bearings 12 and two turbine bearings 19, 20, and the upper support plate 9 has three rotary bearings 14 and two turbine bearings 21, 22. The turbine bearings 17, 20 and 22 are not shown in FIG. 2, and are associated with the other turbine.

The rotary bearings 10, 11 on the one hand and 13, 14 on the other hand are kept at a spacing by a spacer collar 23, 24. The spacer collar is in the form of a hollow tube.

Finally, FIG. 3 is a plan view of the wind-powered generator. The turbine blades 25 can be seen. The wind direction, when the wind-powered generator according to the invention has turned to the wind in such a way that the tip of the V-shaped wind splitter 3 points counter to the wind, is also indicated with an arrow.

Figure 5:
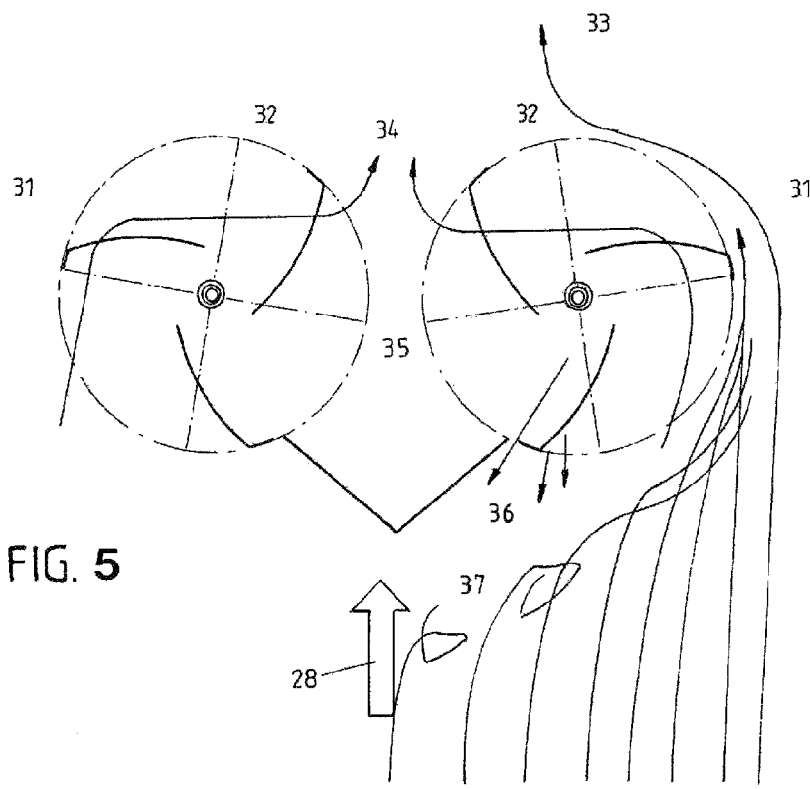
FIG. 5 shows the thread test.

What is known as a thread test was carried out on the system according to the invention (FIG. 5). Wind 28 at up to 6 m/s was blowing into the system. The ratio of the circumferential speed of the turbine to the wind was up to 3:1. The point where the thread direction breaks away can be seen clearly in FIG. 5 (at the bottom of the picture). The system according to the invention can extract energy from the pressure difference or the potential energy of the wind, not just from the kinetic energy of the moving air.

The significance of the reference numerals in FIG. 5 can be seen from the list of reference numerals.

A side effect is the ping-pong ball that is "suspended" in an oblique airstream. As a result of the Conda effect, the flow of the airstream is not stripped away from the ball, but encircles it (almost) completely without being stripped away. Since the ball is suspended slightly below the center of the airstream, the air does not flow around it symmetrically. More air is deflected downward, since the flow speed and flow cross-section are lower at the underside of the ball than at the upper side. As a result, the ball experiences an upward force. This is superposed on the Magnus effect (the ball rotating). The two effects each prevent the ball from falling downward and only allow it to "slip" along the underside of the airstream. The resistance of the ball to the flow holds it at a spacing from the nozzle, and gravity prevents it from simply being blown away. Thus, the ball can float in a more or less stable position.

Figure 6:
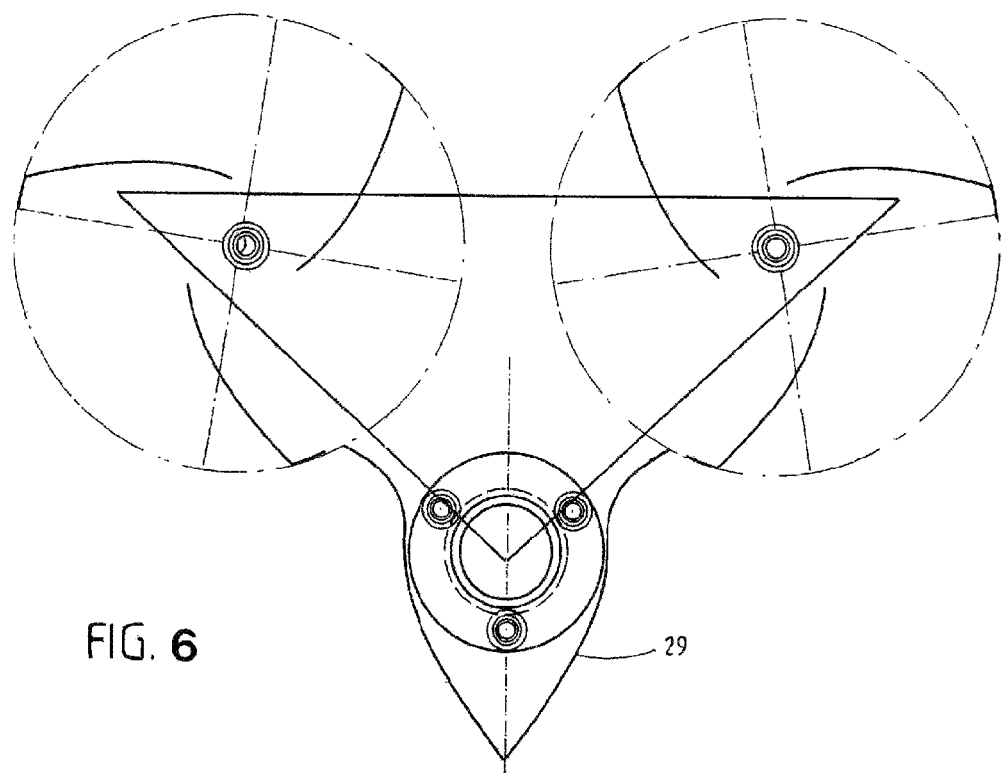
FIGS. 6 to 8 show further variants with modified wind splitters 29 and additional concentration plates 30.
Figure 7:
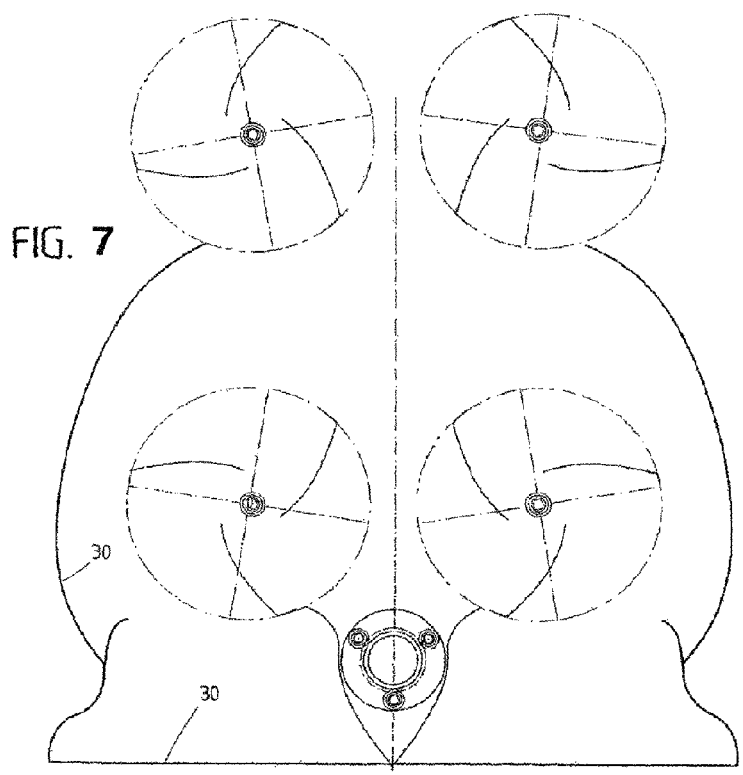
Figure 8:
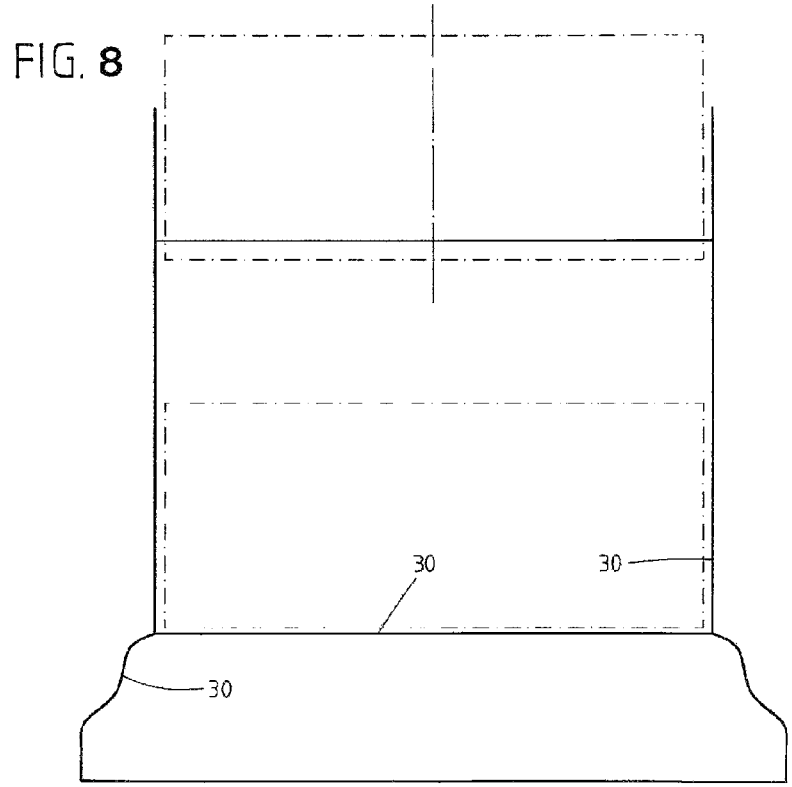

FIGS. 6 to 8 show further variants with modified deflector surfaces 29 and additional concentration plates 30.

Evaluation of static and dynamic torque measurements on the wind turbine according to the invention of diameter 1 m and length 1 m in Moers The following data are taken into account, directly or indirectly, in the evaluation:

Static torque measurements (stationary torque) from 24 to 26 Sep. 2010

Dynamic torque measurements in the period from 4 to 8 Nov. 2010

An eddy current brake, with which various braking forces could be set by varying the coil current, was also used during the dynamic measurements in each case.

The measurement values were checked for plausibility and evaluated using various averaging and filtering methods.

The result data for wind speeds of between 2 and 8 m/s are compiled in the following table.

TABLE 1

Result data on the evaluation of static and dynamic torque measurements (September/November 2010) on the wind turbine according to the invention of diameter 1 m and length 1 m in Moers

| Wind speed [m/s] | Rotational speed [rpm] | Torque [Nm] | Mechanical power [W] (calculated therefrom) |
|---|---|---|---|
| 2 | 0 | 0.45 | 0.0 |
| 2 | 17 | 0.90 | 1.6 |
| 2 | 20 | 0.69 | 1.4 |
| 2 | 55 | 0.16 | 0.9 |
| 2 | 78 | 0.00 | 0.0 |
| 3 | 0 | 0.90 | 0.0 |
| 3 | 27 | 1.85 | 5.2 |
| 3 | 35 | 1.48 | 5.4 |
| 3 | 35 | 1.40 | 5.1 |
| 3 | 40 | 1.27 | 5.3 |
| 3 | 42 | 0.93 | 4.1 |
| 3 | 50 | 0.87 | 4.6 |
| 3 | 55 | 0.52 | 3.0 |
| 3 | 60 | 0.70 | 4.4 |
| 3 | 80 | 0.21 | 1.8 |
| 3 | 105 | 0.00 | 0.0 |
| 3 | 107 | 0.00 | 0.0 |
| 3 | 115 | 0.00 | 0.0 |
| 4 | 0 | 1.45 | 0.0 |
| 4 | 50 | 2.45 | 12.8 |
| 4 | 55 | 2.15 | 12.4 |
| 4 | 57 | 1.90 | 11.3 |
| 4 | 60 | 1.80 | 11.3 |
| 4 | 65 | 1.55 | 10.6 |
| 4 | 69 | 1.25 | 9.0 |
| 4 | 80 | 0.82 | 6.9 |
| 4 | 80 | 1.12 | 9.4 |
| 4 | 95 | 0.64 | 6.4 |
| 4 | 107 | 0.28 | 3.1 |
| 4 | 137 | 0.00 | 0.0 |
| 4 | 139 | 0.00 | 0.0 |
| 4 | 145 | 0.00 | 0.0 |
| 5 | 0 | 2.00 | 0.0 |
| 5 | 75 | 3.00 | 23.6 |
| 5 | 78 | 3.30 | 27.0 |
| 5 | 85 | 2.80 | 24.9 |
| 5 | 85 | 2.23 | 19.8 |
| 5 | 85 | 1.85 | 16.5 |
| 5 | 93 | 1.42 | 13.8 |
| 5 | 110 | 1.35 | 15.6 |
| 5 | 120 | 0.31 | 3.9 |
| 5 | 120 | 0.98 | 12.3 |
| 5 | 127 | 0.71 | 9.4 |
| 5 | 165 | 0.00 | 0.0 |
| 5 | 174 | 0.00 | 0.0 |
| 5 | 177 | 0.00 | 0.0 |
| 6 | 0 | 2.70 | 0.0 |
| 6 | 100 | 3.65 | 38.2 |
| 6 | 113 | 2.70 | 31.9 |
| 6 | 115 | 3.35 | 40.3 |
| 6 | 116 | 2.15 | 26.1 |
| 6 | 120 | 1.81 | 22.7 |
| 6 | 140 | 1.53 | 22.4 |
| 6 | 152 | 0.34 | 5.4 |
| 6 | 160 | 0.75 | 12.6 |
| 6 | 195 | 0.00 | 0.0 |
| 6 | 209 | 0.00 | 0.0 |
| 6 | 210 | 0.00 | 0.0 |
| 7 | 0 | 3.50 | 0.0 |
| 7 | 130 | 4.30 | 58.5 |
| 7 | 147 | 3.27 | 50.3 |
| 7 | 160 | 1.65 | 27.6 |
| 7 | 175 | 0.79 | 14.5 |
| 7 | 225 | 0.00 | 0.0 |
| 7 | 245 | 0.00 | 0.0 |
| 8 | 0 | 4.25 | 0.0 |
| 8 | 162 | 4.85 | 82.3 |
| 8 | 190 | 3.75 | 74.6 |
| 8 | 210 | 0.84 | 18.5 |
| 8 | 250 | 0.00 | 0.0 |
| 8 | 275 | 0.00 | 0.0 |

Figure 9:
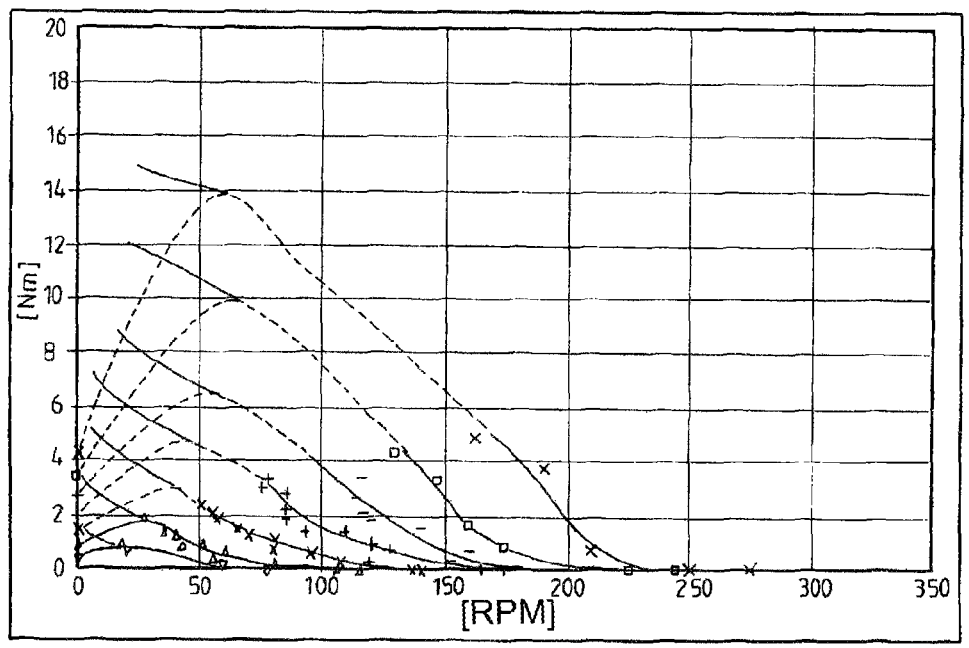
FIG. 9 shows torque vs. rotational speed characteristics.
Figure 10:
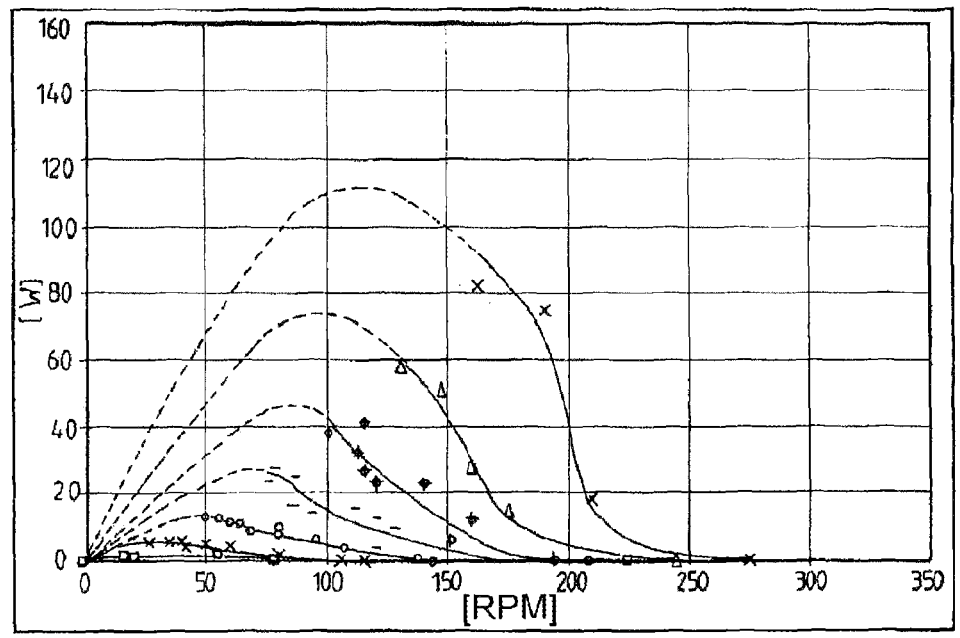
FIG. 10 shows further characteristics.

FIGS. 9 and 10 are graphical representations with corresponding interpolated lines.

FIG. 9: torque vs. rotational speed characteristics, interpolation with average power coefficient (PC) 35%

Torque [Nm] vs. rotational speed [rpm]; parameter wind speed [m/s]

Key to Graph:
- ♦ 2 m/s measurement
- ▲ 3 m/s measurement
- X 4 m/s measurement
- + 5 m/s measurement
- – 6 m/s from measurement
- ■ 7 m/s from measurement
- × 8 m/s from measurement
- - - - - - - max. torque
- - - - - ave. torque FIG. 10: characteristics Mech. power Extrapolation in the maximum power range with average PC=35%

Mechanical power [W] vs. torque [rpm]; parameter wind speed [m/s]

Key to Graph:
- ■ 2 m/s eddy current brake
- × 3 m/s eddy current brake
- • 4 m/s eddy current brake
- – 5 m/s eddy current brake
- ♦ 6 m/s from eddy current brake
- ▲ 7 m/s from eddy current brake
- X 8 m/s from eddy current brake Since the dynamic measurements thus far have only been carried out with relatively weak braking forces, the interpolation outside the measurement range that has been established thus far is shown in dashed lines. In this context, it has been assumed that at the maximum power point a power coefficient of 35% is achieved. From the dispersion of the result data, sufficiently precise calibration verification for the measurement technique used can provisionally be placed at approximately 30-40%. Otherwise, the systematic errors in the measurement technique have to be additionally taken into account. The power coefficient can be determined more precisely if further measurements at higher braking forces are taken into account.

The turbine system according to the invention can also advantageously be used in water for obtaining energy from the flow of water, that is to say as a marine turbine system.

Figure 11:
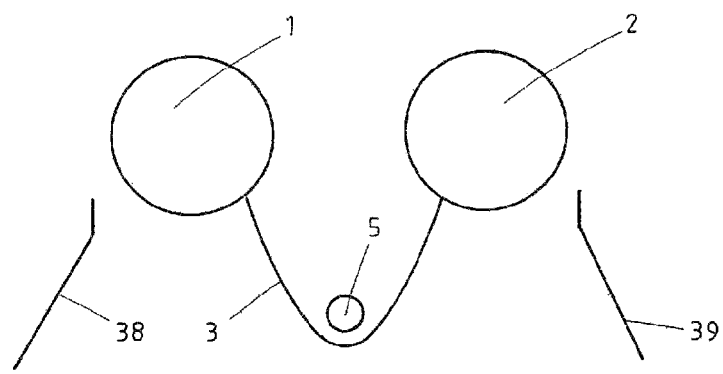
FIG. 11 is a view with two additional deflector plates 38, 39.

Attaching two additional deflector plates 38, 39 (see FIG. 11) results in what is known as the Venturi effect. The Venturi effect increases the efficiency of the turbines.

From the development, a further embodiment is presented that has demonstrated high efficiency values in turbulent wind in the preliminary studies.

Figure 12:
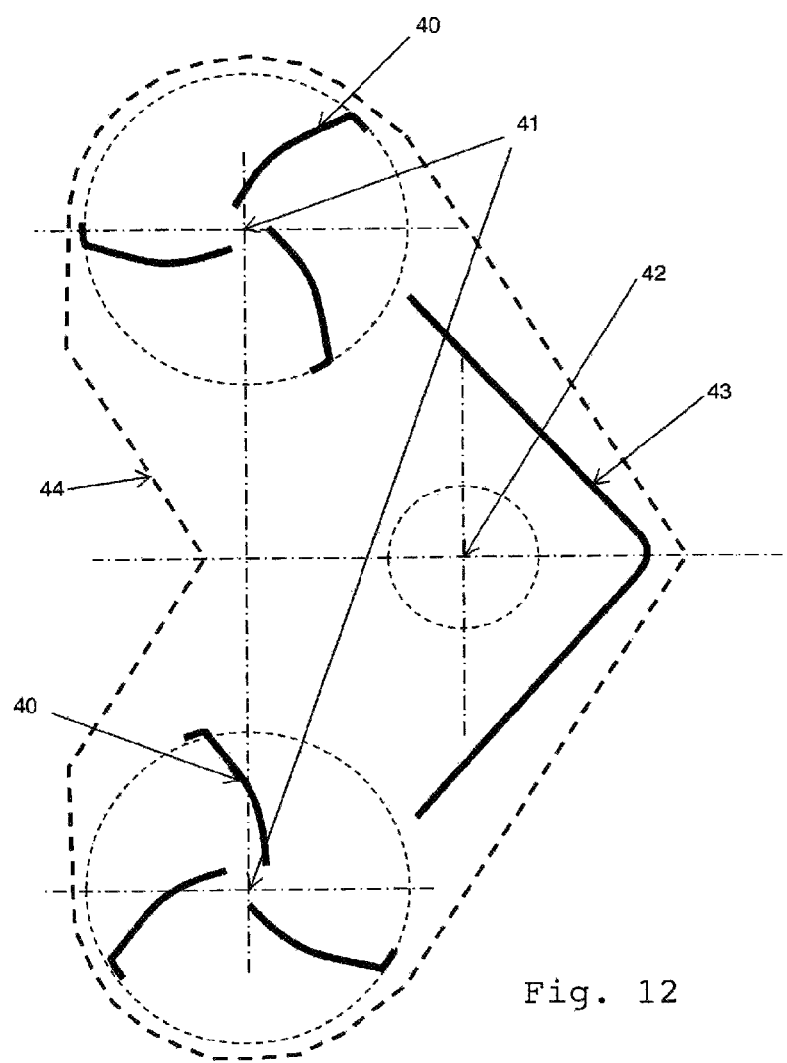
FIG. 12 and FIG. 13a are views with an optimized deflector plate in the form of a "nose"
Figure 13A:
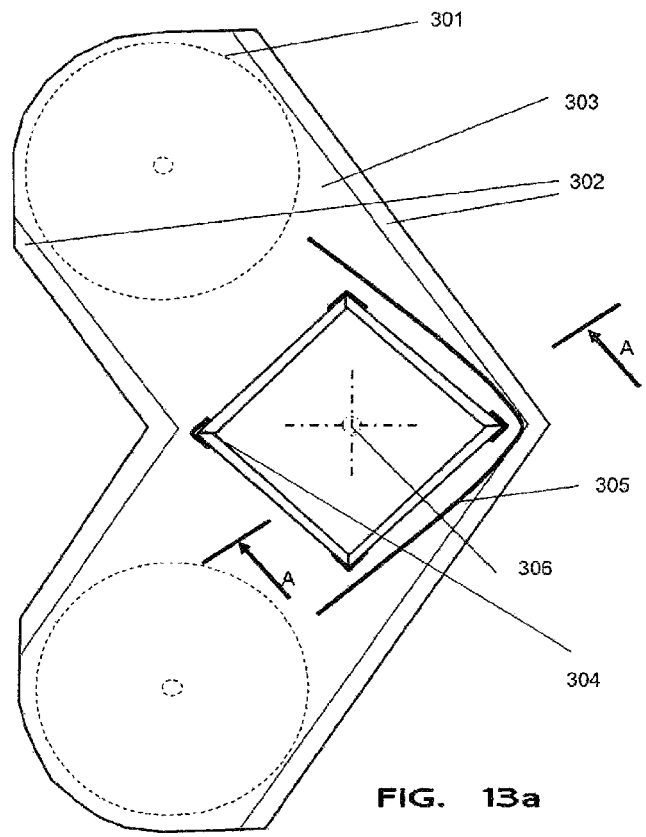

The pivot point for the independent azimuth adjustment and the deflector plate in the form of a "nose" has been optimized (see FIG. 12 and FIG. 13a). In this case, the turbine system already turns optimally to the wind from approximately 1.0 m/s when the turbine support system is well mounted.

Advantageously, the upper tower section is rotatably mounted relative to the lower tower section. The mounting is configured such that, above a wind speed of approximately 1.0 m/s, the azimuth torque is sufficient to safely overcome the brake forces of the bearings, taking into account the wind pressure.

By contrast to the published solution of the international patent application WO 2011/059760 A2 (having the priority of 29.10.2009), the invention in this case relates to an aerodynamically optimized system that automatically orientates itself to face into the wind. Efficient operation is only possible if it can be guaranteed that the orientation to face into the wind can take place with no (or with almost no) additional energy. This applies all the more to wind-powered generators of the VAWT type that operate more easily in regions of light wind at low heights.

Moreover, it should be noted that the principle of the above-mentioned patent application had already been applied for as a specific configuration more than 2 months earlier (see WO 2011/022836 A8—having the priority of 28.08.2009). As a distinction from the last-mentioned application having earlier priority, it should be noted that this device does not orientate itself to face into the wind at low wind speeds, which can easily be demonstrated by reproduction, for example with a turbine diameter of approximately 1 m including power transmission and a connected generator. Instead of the described sail, an aerodynamically optimized double deflector plate in the form of a "nose" is additionally used in this case that increases the efficiency of the whole system and simultaneously guarantees automatic orientation to face into the wind for all winds having relevant energy, including light winds from wind force 1.

The V-shaped "nose" according to the invention (referred to as a wind splitter) was not primarily developed as either an accelerator or as a deflector. Rather, it serves as a resonance chamber for infrasound in the range of approximately 1 to 10 Hz (i.e. silent). The nose and rotor blade form an air guide device for generating a pressure oscillation between the nose and the rotor blade in the interior of the nose. This pressure oscillation takes place in phase with the rotation of the turbine. By means of this silent pressure oscillation and a generally very low-vibration construction, the efficiency of the turbine is increased in regions of light wind, such that it is eminently suitable for use in urban areas.

The spacing between the V-shaped wind splitter and the turbines is preferably variable and adjustable, so that optimum operating conditions can be achieved for all wind conditions.

The edge of the V-shaped wind splitter (3) is preferably rounded, in order to prevent a tendency to whistling and to the formation of turbulence.

A further parameter for characterizing the embodiment is the height of the turbine and/or row of turbines. Functionally, the height can be adjusted largely as desired, for example according to a site of operation approximately 0.3 to 100 times the radius of the turbine, wherein a tall (or long) turbine can be configured as a positive-fit coupling of a plurality of turbines to a shaft that is optionally flexibly connected by positive-fit couplings.

In the embodiment, a ratio of height to radius of approximately 20 is set. In this case, the turbines are all mounted approximately 5 m apart and are interconnected by a flexible, positive-fit coupling, and are connected directly or indirectly via a gearbox to a current generator at the end of the shaft, the bearing being rigidly connected to the rotatable part of the mast.

Figure 13B:
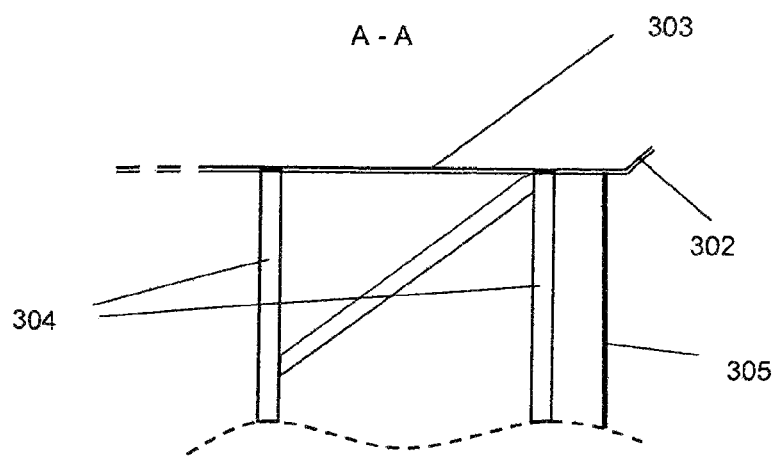

A further variant relates to the upper or lower end of the turbine. By means of a planar wind guide plate that is chamfered away from the turbine at the outer edges optionally slightly and up to approximately 45°, the wind can be deflected in the edge region onto the turbine more effectively (see FIGS. 13a and 13b). FIG. 13b shows a plan view of the section A-A in FIG. 13a. Moreover, the stability of the turbine suspension is improved thereby.

In order to avert and/or reduce danger in the event of heavy storms, the system can be equipped with a self-damping control system, such that the turbines are moved closer together above a certain wind speed; the dynamic pressure at the back behind the "nose" is increased thereby that ultimately leads to the damping of the rotational speed, such that when this damping system is suitably dimensioned, the rotational speeds can be kept in the safe range. The damping can be verified when the spacing between two turbine shafts is less than 3×R1 (R1=radius of the turbine). An additional mechanical brake would only be necessary in the event of a very improbable emergency or for maintenance work.

The aim of the turbine system is to obtain the optimum amount of energy from the wind, wherein obtaining electrical energy is the priority. In addition, a generator adapted to the turbine system is mechanically connected to the turbine shaft directly or indirectly via a gearbox in a non-positive or positive-fit manner, which shaft is connected to the turbines in a non-positive or positive-fit manner, in order to guarantee the transmission of power from the turbine to the generator. In this case, one generator can be used for the two turbines, or each turbine can each be individually connected to a generator.

The generator is controlled according to the wind speed, such that by controlling the generated power, an electromagnetic braking torque is transmitted to the turbine, such that an optimum tip speed ratio (TSR) for converting energy is set that is between 45% and 65% based on the tip speed ratio of the unbraked turbine. As a result, the maximum possible energy can always be "harvested".

The generated electrical energy (direct current, alternating current, three-phase current) can be utilized in a plurality of ways:
  a) it can be converted into grid-synchronous alternating voltage and fed into the public power grid,
  b) it can be buffered in a local battery system, i.e. a battery system located in the tower, which is converted into grid-synchronous alternating voltage according to the requirements of the network operator, taking into account the maintenance of a consistently receptive battery system, intermittently with a high degree of efficiency, and then fed into the public power grid. In this variant, there will be times where only charging takes place, where only discharging takes place and the electrical energy is fed into the grid, or where the charging and discharging take place in parallel. Optionally, this variant also allows buffering of the current from the grid in times of low current uptake; an embodiment of this type would be a combined wind energy system comprising integrated storage components that can be used internally and externally.

In order to safely preclude overcharging the battery system or overloading the current transformer to the grid feed, the control system in the embodiment allows excess generated electrical energy, which can neither be charged into a battery nor fed into the grid, to be converted by a chopper resistor into heat, in a manner that is safe and free from wear. By means of this control system, the range of applications of relevant wind speeds can be optimally expanded.

A further variant relates to use as an advertising medium or as street lighting. Any desired highly efficient light sources, for example LEDs for advertising illumination or street lighting, can be attached to the turbine system whilst adhering to the external shape specifications (turbine, nose-deflector plate, upper and lower cover). The current would be supplied directly from the battery system and is therefore also still independent from the grid.

The control system of the turbine system is also independent from the grid, since it is powered by an independent battery that is stored in a fireproof manner and is permanently monitored.

A further variant relates to a use as a support for urban infrastructure measures, for example alarm devices, surveillance cameras, mobile phone antennae, urban WLAN Intranet, display boards, traffic guidance devices, broadband internet connection, etc. In this case, the particular advantage is that an independent current source (battery storage) is available locally on site.

When there is low demand for electrical energy, the wind and solar energy can be stored locally for later use and by selectively discharging at peak times, a particularly economical use can be achieved.

In a further embodiment, a grid mast construction that is and/or can be used as a frame for the special accumulator and turbine mounting system, is provided above the rotary connection that is fixed to a stationary mast (see FIG. 13*a*). The cavity inside the grid mast provides enough space for safely installing/fastening accumulators and for load control; at the same time, the cable lengths from the generator can be kept short so as to keep Ohmic losses low.

It is advantageous to bring together a plurality of windtrackers to form a decentralized network-communicating energy supply system and other applications. It is therefore proposed to provide an arrangement of the turbine systems according to the invention and/or of the windtrackers along the traffic infrastructure, such as streets, motorways, railway lines and canals, which arrangement is additionally provided for telecommunications or for buffering current from the grid in times of low current uptake and/or for use as an advertising medium and/or as street lighting and/or for providing safety spaces.

The invention claimed is:

1. A wind or water-powered generator comprising:
   two interconnected radial turbines oriented parallel side by side and each having a vertical rotation shaft and upper and lower horizontal end fixed wind-guide plates each in turn having an outer edge chamfered away from the respective turbine;
   a V-shaped wind splitter; and
   a pivot shaft parallel to the turbine shafts and supporting the turbines and the V-shaped wind splitter for rotation about a vertical axis positioned outside a connecting line extending horizontally between the turbine shafts with both of the turbines being on the same side of the connecting line.

2. The wind or water-powered generator according to claim 1, wherein the two turbines rotate in opposite directions.

3. The wind or water-powered generator according to claim 1, wherein the pivot shaft is a grid mast provided with upper, lower, and middle bearings carrying the turbines together with the V-shaped wind splitter and the upper and lower rounded end plates.

4. The wind or water-powered generator according to claim 1, further comprising a commutator ring integrated into a rotary connection and transmitting electrical power and electronic signals from the turbines.

5. The wind or water-powered generator according to claim 1, further comprising additional external deflector surfaces on the same side as the V-shaped wind splitter.

6. The wind or water-powered generator according to claim 1, further comprising means for automatically moving the radial turbines closer together when a predetermined wind speed is reached.

7. The wind or water-powered generator according to claim 1, wherein a leading edge of the V-shaped wind splitter is rounded.

* * * * *